United States Patent [19]

Kwolek et al.

[11] 3,856,120

[45] Dec. 24, 1974

[54] DISC BRAKE WITH SEMI-METALLIC AND ORGANIC FRICTION PADS

[75] Inventors: John P. Kwolek; Patrick A. Thesier, both of Troy, N.Y.

[73] Assignee: The Bendix Corporation

[22] Filed: Dec. 14, 1972

[21] Appl. No.: 315,262

[52] U.S. Cl............. 188/251 A, 260/38, 188/73.1
[51] Int. Cl............................................ F16d 69/02
[58] Field of Search ....... 188/251 R, 251 A, 251 M, 188/73.1, 73.2; 260/38

[56] References Cited
UNITED STATES PATENTS

| | | | |
|---|---|---|---|
| 2,910,449 | 10/1959 | Evans | 188/251 R |
| 3,007,549 | 11/1961 | Klein | 188/251 R |
| 3,269,976 | 8/1966 | Veda | 188/251 M |
| 3,344,094 | 9/1967 | de Gaugue | 188/251 A |
| 3,434,998 | 3/1969 | Aldrich et al. | 188/251 M |
| 3,478,849 | 11/1969 | Hahm | 188/251 M |
| 3,647,033 | 3/1972 | Klein | 188/251 R |
| 3,655,609 | 4/1972 | Evans et al. | 188/251 R |

*Primary Examiner*—Trygve M. Blix
*Assistant Examiner*—Edward R. Kazenske
*Attorney, Agent, or Firm*—Leo H. McCormick, Jr.; William N. Antonis

[57] ABSTRACT

A disc brake apparatus having a first friction pad of an organic lining and a second friction pad of a semi-metallic lining for opposing movement of a rotor upon a brake application to provide a uniform coefficient of friction when subjected to varying deceleration conditions.

1 Claim, 10 Drawing Figures

ORGANIC "A" FRICTION LINING

SEMI-MET. "X" SEMI METALLIC FRICTION LINING

COMBINATION "A"/"X" COMBUSTION ORGANIC AND SEMI METALLIC FRICTION LINING IN SAME BRAKE

LINE PRESSURE

1st FADE
60 MPH
15 FT. SEC.   RECOVERY

STOPS

2nd FADE
60 MPH
15 FT. SEC.   RECOVERY

DISC BRAKE WITH SEMI-METALLIC AND ORGANIC FRICTION PADS

BACKGROUND OF THE INVENTION

Disc brakes presently being produced must be compounded and fabricated in such a way as to ultimately be acceptable for vehicle usage from the following standpoints:

a. Noise — This is an important factor on all U.S. passenger car applications, the presence of which can create staggering warranty costs from dissatisfied customers who insist on replacement of the disc pads to eliminate this condition;

b. Friction — High lining friction coefficients at all speeds have been generally desired by manufacturers, but this characteristic could be compromised since guide lines had broad limits within which acceptable lining could be produced;

c. Fade Resistance (friction loss at elevated temperatures) — Current linings have to meet fade resistance requirements under Section 105 of the FMVSS. With current organic linings on some weight classes of vehicles, this fade resistance standard has been hard to meet. The current federal requirement is that pedal force must not exceed 200 lbs. pedal effort on the first four stops of the first and third fade and on the first eight stops of the second fade test procedures;

d. Recovery (ability to regain friction after a fade) — Federal and customer requirements in this characteristic have also been easily met with some vehicles but difficult with others using current organic lining compositions;

e. Lining compressibility — Current organic linings have been marginal in this characteristic on some larger weight vehicles which require larger disc brake piston diameters resulting in minimal brake fluid reserve with a full brake application. Lining compression has the effect of diminishing the fluid reserve;

f. Rotor conditioning — Linings whose frictional components are destructive to the opposing rotor surface are considered nonacceptable. Modifiers which are destructive to rotors even though desirable for heat transfer and friction production must be used very sparingly;

g. Life — The durability or life of linings while not being federally legislated, must meet certain minimum customer requirements so as to avoid warranty costs for premature wear out. Ingredients in organic linings which enhance other characteristics but at the expense of poor life must also be used sparingly. Current organics demonstrate adequate life at temperatures ranging from ambient to approximately 450°F, the usual temperature range produced during normal braking applications; and h. Cost — Current organic linings are the most cost effective means known to meet the minimum Section 105 FMVSS requirements.

However, with the current state of the art of development of organic disc linings, the compounding of organic linings which are acceptable for vehicle usage possess limitations. These limitations can be characterized as follows:

a. Fade Resistance — Known frictional modifiers of improving the fade resistance of organic linings have adverse effects on either friction, wear, noise or rotor conditioning on any organic composition when used in large quantities. Thus, a definite limitation is placed on the degree of improvement of fade resistance without becoming unacceptable from one or more of these other characteristic standpoints;

b. Recovery — The same situation exists as does with fade resistance;

c. High Speed Friction — Current organic linings generally show less friction at high speed than at low speeds. Ingredients which are known to improve friction have adverse effects on one or combination of wear, noise, rotor conditioning, compressibility and fade resistance characteristics;

d. Lining Compressibility — The exclusion of ingredients which contribute to lining compressibility has an adverse effect on the noise, wear and frictional properties of organic linings, limiting the compressibility characteristics;

e. High Temperature Life — The very nature of organic materials places a definite upper limit on the high temperature life characteristics of organic linings usually 800°F, with most organic materials starting major decomposition at about 500°F. In disc brakes, the operating temperature frequently will be between 400°F and 550°F; and f. Friction Stability — The products of decomposition, which in essence begins after the initial brake application, have different frictional characteristics than the original composition, and the present state of the art inability to effectively provide constant friction characteristics regardless of the state of decomposition has resulted in organic friction materials which have limitations in their ability to provide a stable friction characteristic under all conditions.

Suitable organic wear pads for disc brakes for today's vehicles have upper limitations with desirable characteristics either because of the organic nature of the ingredients used or because present state of the art compositions are unable to compensate for any one characteristic without the sacrifice of some other with the associated potential of thereby destroying the acceptability of the particular lining.

Customers, manufacturers, and the Department of Transportation of the U.S. Government recognizing these limitations are insisting on brake lining with improved characteristics in high speed friction, fade recovery, compressibility, high temperature life and friction stability. A proposed standard for the improvement of these characteristics is as follows:

a. High Speed Friction — The imposition of stringent stopping distance requirements by the Department of Transportation in the new FMVSS 105A, and the current physical limitations of existing brake hydraulic actuating systems, such as limited room from power brake units, limitations on brake pedal height, master cylinder diameter and stroke, combine in certain instances to produce a premium on high friction, at all of the test speeds at which stopping distances are specified (30, 60 and 80 mph). The tendency for organic liners to exhibit poorer friction at high speeds (such as 80 mph) is currently marginal at present day normal test weights and result in the need for an improved brake lining system;

b. Fade Resistance — Increased passenger car weights, increased manufacturer fade resistance specification and increased fade resistance requirements by Department of Transportation in Section 105A of the FMVSS all combined to limit the conditions wherein organic lining will be acceptable in brake lining;

c. Recovery — Higher weights also place a strain on the lining's ability to recover from a faded condition. The Department of Transportation requirements in Section 105 of the FMVSS have narrowed the limits within which linings must perform during recovery. In some applications, where organic linings are marginal at current weights in meeting those standards, heavier weights and proposed standards will result in a need for a new brake lining system to meet these requirements;

d. Compressibility — In applications where brake effectiveness sufficient to meet the stopping distance requirements of the Department of Transportation has resulted in larger actuation piston diameters for the wheel cylinders, the retention of desirable margins of hydraulic fluid reserve becomes a problem with current fixed capacity master cylinders. With some systems being marginal at current weights and under current requirements, the addition of more weight, resulting in higher lining application pressures will place a higher premium on improved resistance to compression in the brake wear pads;

e. High Temperature Life — Increased vehicle weights which result in higher brake duty in turn results in higher brake operating temperatures. A further result is a reduction in organic lining life due to more frequent operation at the temperatures at which wear is greatly accelerated. Thus, premature lining wear-out while simultaneously increasing brake operating temperatures in some applications results in the need to improve the high temperature wear resistance of the linings for use in most vehicles;

f. Friction Stability — The stopping distance requirements by the Department of Transportation in Section 105A of the FMVSS has resulted in the further requirement that brake systems be quite well balanced regarding front and rear axle brake effectiveness so that a sufficiently high rate of deceleration is attainable prior to wheel slide. Any changes in the effectiveness of either axle will upset the front to rear brake balance and prevent compliance to stopping distance requirements. Thus, the propensity for organic linings to change as they decompose will be an extreme limitation in those applications where decomposition temperature are experienced frequently. In these applications, changes in friction can upset brake balance and lead to premature wheel slide on one of the two axles with resulting adverse effect on stopping distance; and g. In-Stop Friction Variation — During high energy stops, friction materials are subjected to variations in rubbing speed and operating temperatures. These fluctuations in operating conditions will usually result in changes in the dynamic coefficient of friction. Organic materials often exhibit a loss of friction, sometimes referred to as "In-Stop Fade," while semi-metallic materials exhibit an increase in friction throughout a stop. Since any changes in friction can affect the brake system's balance, it's highly desirable to maintain a constant dynamic coefficient of friction throughout high energy stops to prevent premature wheel lock and assuring minimum stopping distances.

It has been shown that the use of a semi-metallic friction material would provide substantial improvements in the characteristics of high speed friction, fade resistance, recovery, compressibility, high temperature life and friction stability. However, the use of semi-metallic disc pads also has the disadvantages of: (1) substantially higher cost than organic disc pads, and (2) an increase in the coefficient of friction during a stop. As a result, semi-metallic is currently used mainly in only those applications where the lining cost is not a great factor and the brakes are subjected to numerous panic stop conditions such as in emergency vehicles.

SUMMARY OF THE INVENTION

We have devised a disc brake apparatus for use in a braking system wherein a semi-metallic lining material in combination with an organic lining material can produce a brake lining combination that uniquely provides substantial improvements in high speed friction, fade resistance, recovery, compressibility, high temperature life and friction-stability-with-usage which will meet or exceed Section 105A of the FMVSS of the Department of Transportation.

It is therefore the object of this invention to provide a matched disc brake lining combination having an organic lining pad and a semi-metallic lining pad for engaging a rotor to provide a uniform coefficient of friction over a predetermined operating range.

It is another object of this invention to provide a frictionally balanced braking system by establishing a uniform coefficeint of friction to each wheel of a vehicle in an operating range to prevent premature wheel slide which could affect stopping.

It is a further object of this invention to provide a means of simultaneously engaging an organic wear pad and a semi-metallic wear pad with a rotor of a disc brake to proportionally stop a vehicle from varying speeds by developing a uniform coefficient of friction.

These and other objects will be apparent from reading this specification and viewing the drawings.

DETAILED DESCRIPTION OF THE PREFERRED EMBODIMENT

Figure 1:
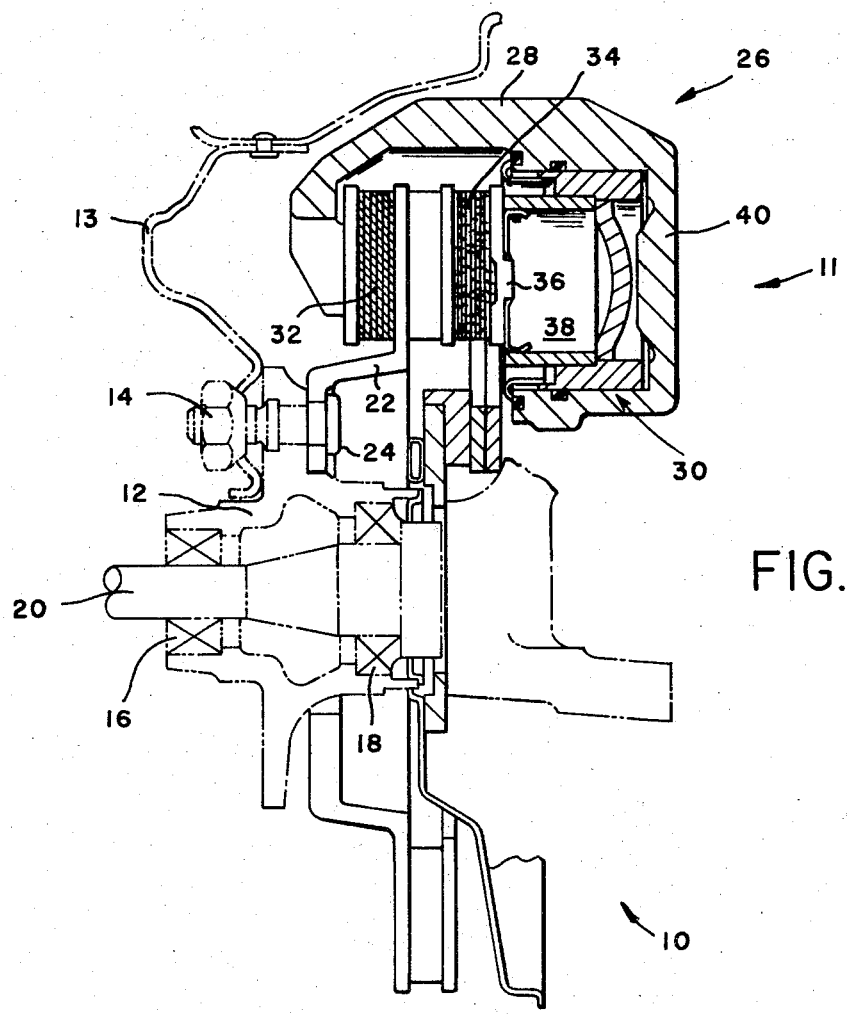
FIG. 1 is a sectional view of a disc brake for use in the braking system of a vehicle having dissimilar friction pads for engaging a rotor to provide a uniform coefficient of friction during a braking application.
Figure 2:
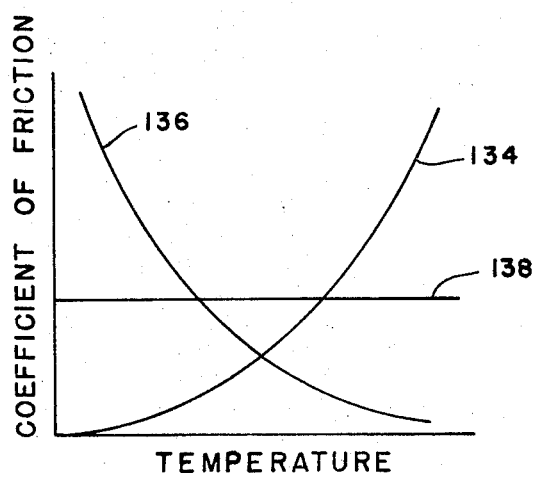
FIG. 2 is a graph showing the effect of temperature on the coefficient of friction for an organic friction pad, semi-metallic friction pad and a combination of both.

FIG. 1 shows a disc brake means 11 for a wheel and brake assembly 10 having a first friction pad 32 constructed of a semi-metallic material and a second friction pad 34 constructed of an organic material.

The wheel and brake assembly 10 has a rim 13 which is attached to mounting member or hub 12 by suitable means, shown here as bolts 14. Hub 12 is attached by bearings 16, 18 to the shaft 20 of the vehicle, not shown. A rotor member 22 is also attached to the mounting member 12 and in this instance is attached thereto by the stud portion 24 of bolts 14. The disc brake means 11 illustrated in FIG. 1 is of the single or floating cylinder caliper type with a stator means 26 having a body 40 with an arm member 28, a cylinder means 30 and a pair of disc pads 32 and 34. The stator or caliper means 26 is fixed to the frame (not shown) or other suitable portion of the vehicle. The pads 32 and 34 are arranged to be on opposite sides of the rotor 22 with pad 32 being attached to the arm member 28 and pad 34 attached to a piston 36 located in an expansion chamber 38.

Upon the introduction of pressurized fluid into the cylinder means 30 from master cylinder or other intensifying means (not shown), the fluid is communicated into expansion chamber 38 to force piston 36 leftward and the body 40 of the cylinder means 30 rightward, relative to the drawing. This forces the brake pads 32 and 34 into intimate contact with the respective surfaces of the rotor 22 thereby applying a desired braking force with a substantially uniform coefficient of friction therebetween.

With organic pad 34 located adjacent the piston 36, the fluid in chamber 38 will dissipate a portion of the heat generated by the frictional engagement with the rotor 22. This in effect will shift line 124 in FIG. 5 to the right to provide substantially equal wear of the organic pad 34 with the semi-metallic pad 32 up to about 475°F.

The pad 32, in more particular detail, is constructed from a composition of materials generally indicated as semi-metallic from a typical formula as follows:

Semi-Metallic Friction Material Composition

| Ingredient | Per Cent by Volume of Total Mix | Preferred Limits |
|---|---|---|
| Phenolic Resin | 20 | 15–40% |
| Graphite or Carbon Particles | 25 | 15–40% |
| Fibers * | 15 | 0–25% |
| Ceramic Powders ** | 5 | 2–10% |
| Metal Powders *** | 20 | 15–40% |
| Other Modifiers **** | 15 | 0–20% |
| | 100% | |

* Steel, Asbestos, Ceramic or Carbon fibers with Steel being preferred.
** Magnesium Oxide, Zircon, Mullite, Alumina.
*** Iron, Copper, Brass, Stainless Steel with Iron being preferred.
**** Elastomers, inorganic wear fillers (Whiting).

The ingredients are thoroughly mixed together to form a homogeneous mixture. The mixture is then pressed into briquettes. The briquettes are then transferred to a second press where pressure and heat are simultaneously applied, causing the resin to melt and flow throughout the piece forming a continuous matrix for holding the other ingredients. The lining pads are then transferred to curing ovens and cured at temperatures ranging from 300° to 600°F to further set the resins.

The pad 34, in more particular detail, is constructed from a composition of materials generally indicated as organic from a typical formula as follows:

Organic Friction Material Composition

| Ingredient | Per Cent by Volume of Total Mix | Preferred Limits |
|---|---|---|
| Asbestos | 35 | 20–60 |
| Phenolic Resin | 25 | 10–35 |
| Graphite or Carbon Particles | 6 | 0–10 |
| Cashew Nut Powders | 21 | 10–25 |
| Organic Modifiers * | 3 | 0–15 |
| Inorganic Modifiers ** | 10 | 0–20 |
| | 100% | |

* Elastomeric materials, natural and synthetic rubber scrap, latex, crude molasses, asphaltic base materials, etc.
** Barytes, whiting, talc, rotten stone, etc.

The organic ingredients are thoroughly mixed together to form a mixture. The mixture is then compacted into briquettes by pressing in a mold. The briquettes are then transferred to a second press where a compressive force and heat are applied during which time the resin melts, flows throughout the piece and sets into a matrix for holding the other ingredients. The lining pads are then transferred to a curing oven having a temperature ranging from 300°–600°F to further set the resin.

Figure 3A:
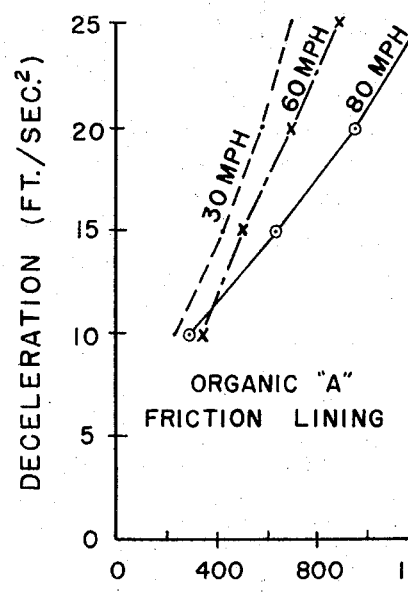
FIGS. 3A, 3B, 3C are graphs showing the brake line hydraulic fluid pressure required to decelerate from 30, 60 and 80 mph for an organic friction pad, semi-metallic friction pad and a combination of both.

The difference between the semi-metallic friction pad 32 and the organic friction pad 34 is clearly evidenced when tested under identical conditions. Basically, these conditions are set forth in Section 105A of the FMVSS issued by the Department of Transportation. One of the most important conditions is that a brake system must exhibit high friction which is insensitive to speed or prior duty. FIG. 3A illustrates effectiveness curves for various speeds of an organic material such as in pad 34 after limited usage at moderate duty. The deficiencies of the organic material are illustrated by the higher line pressures required to achieve constant decelerations at higher speeds. While not illustrated, these effectiveness curves will shift to the left or right depending upon prior usage which further complicates achieving a desired balanced braking system.

Figure 3B:
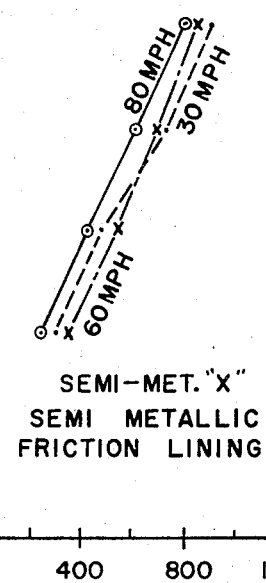
Figure 3C:
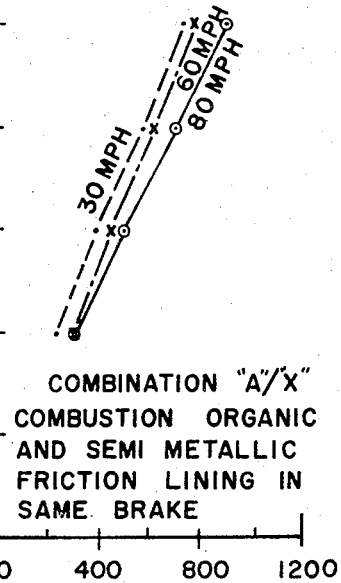

FIG. 3B illustrates effectiveness curves at various speeds of a semi-metallic material such as in pad 32 under the same test conditions as FIG. 3A. These tests indicate that semi-metallic materials show little or no tendency to change with usage. We have found the effectiveness curves of FIG. 3B were essentially duplicated by the combination of pads 32 and pads 34 acting on the same rotor 22 as illustrated by FIG. 3C. The combination exhibited very little spread from speed and the results were continually repeatable with usage.

Figure 4A:
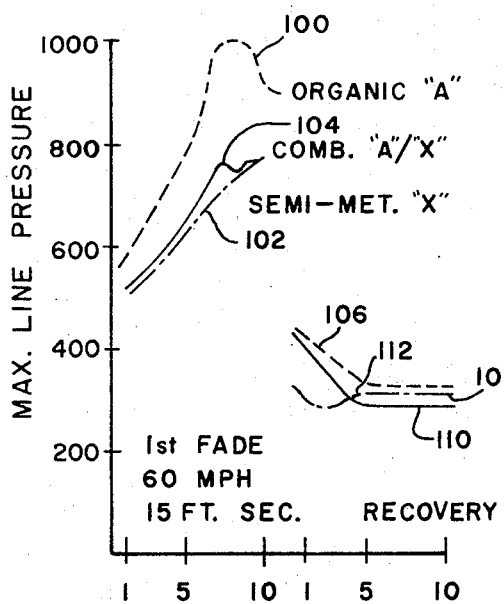
FIGS. 4A, 4B are graphs showing the increase in line pressure with a corresponding decrease in friction with an increase in temperature developed by a series of controlled stops.

Every friction material selected for vehicle submission must exhibit what is known in the industry as good fade and recovery. "Fade" can be defined as the increased line pressure required to maintain constant deceleration in a series of rapid stops, taking place in a relatively short period of time. Because of the relatively high temperatures generated during fades, it's common to find organic friction materials exhibiting rapid increases in line pressure similar to that shown in FIG. 4A by line 100. Likewise, the superior fade resistance of semi-metallic materials, line 102 can be reasoned from the fact that semi-metallic materials have a lower organic content which is less susceptible to decomposition during fades. While it was expected that a combination of organic pads 34 and semi-metallic pads 32 would exhibit fade and recovery characteristics somewhere between those of either material, it was not expected that a combination would be as good as a semi-metallic for fade; see line 104.

Figure 4B:
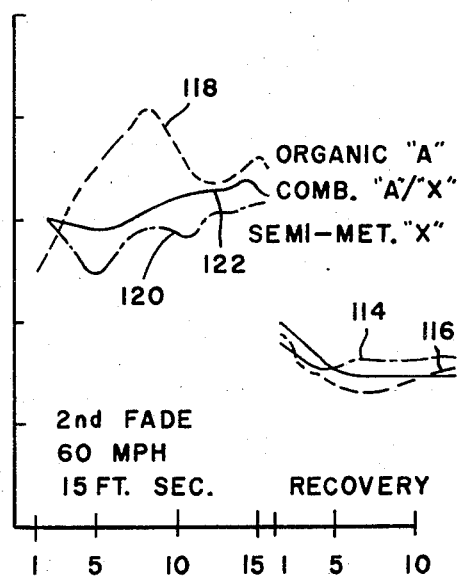

The recovery characteristics of the combinations tested were excellent (see line 106, FIG. 4A for pad 34 alone, line 108 for pad 32 alone, and line 110 for the combination) in that "prior to fade" line pressures were quickly obtained and remained constant even after subsequent fades as illustrated in FIG. 4B. No tendency for "over recovery" was found with the combinations, while both the organic and semi-metallic materials exhibited minor "over recovery" as shown by the inflection points 112, 114 and 116. In the second series of fade tests (see FIG. 4B), where over recovery is present, it is impossible to repeatedly duplicate exactly the same curve characteristic as in the first fade test, FIG. 4A.

This is easily shown by comparing curves 100 and 118 for the individual pad 34, curves 102 and 120 for the individual pad 32, and curves 104 and 122 for the combination of pads 32 and 34 in the disc brake assemblies 10.

Figure 5:
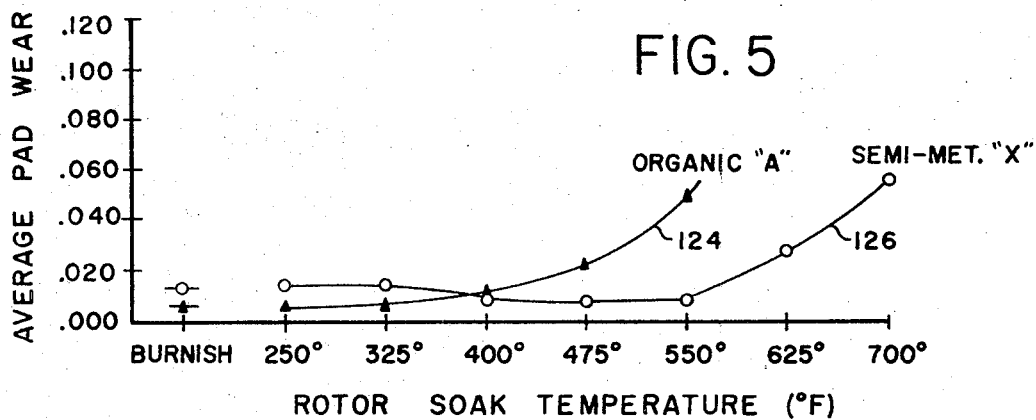
FIG. 5 is a graph showing the effect of temperature on wear of an organic friction pad and a semi-metallic friction pad.

The wear characteristics of the material in the organic pad 34 and semi-metallic pads 32 vary with the severity of usage; see FIG. 5. While organic materials as in pad 34, line 124, generally show better life and less wear at low temperatures, semi-metallic materials as in pad 32, line 126, show significant advantages at higher temperatures. Tests on combinations indicate both the organic and semi-metallic pads retain their own wear characteristics. Light to moderate duty tests show relatively equal pad wear between 325°–425°F, the temperature range normally generated by a 30 mph stop at 15 ft./sec², while severe duty tests show life advantages on the semi-metallic pad 32. However, since average customer usage is generally a mixture of light to moderate duty with occasional heavy duty, it would seem logical to assume combinations will exhibit equivalent or superior life to organics during customer usage.

Figure 6:
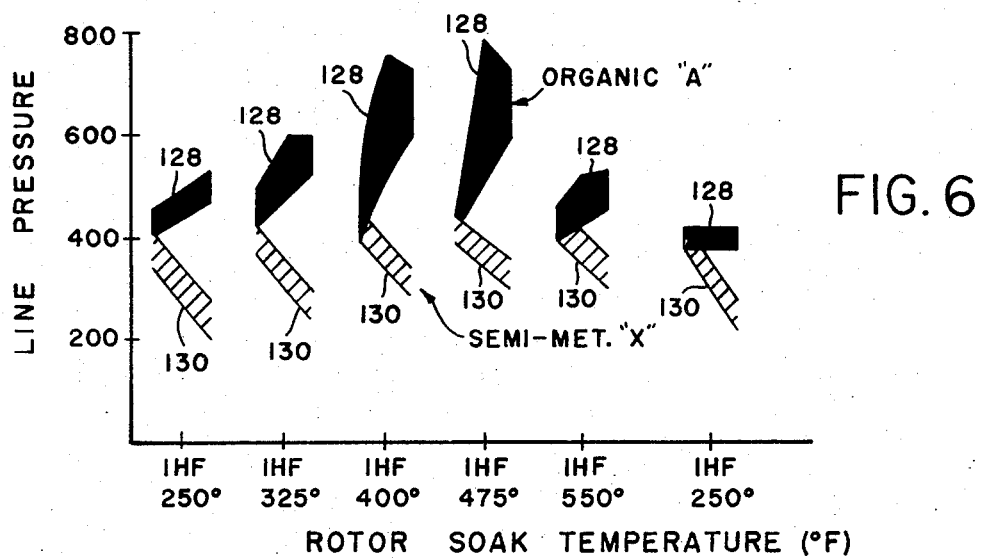
FIG. 6 is a graph showing the effect of temperature on the hydraulic brake line fluid pressure for operating an organic friction pad as compared to a semi-metallic friction pad.

FIG. 6 shows the "In-Stop" friction characteristics of materials in an organic pad 34, line 128 and semi-metallic pad 32, line 130, at various temperatures. Tests were conducted from 50 mph at a constant deceleration of 12 ft./sec². Line pressure variations within each stop were recorded and the initial, held and final line pressures were plotted.

The increases in line pressure exhibited in the organic pad 34 with stops at 400°F and 475°F rotor soak temperature are examples of in-stop fade. Once again, a basic difference between organic pads 34 and semi-metallic pads 32 is illustrated, with the organics showing varying degrees of in-stop fade, while the semi-metallics show the reverse. It should also be pointed out that a recheck of the 250°F (rotor soak) portion after the 550°F portion of the schedule, indicates the friction characteristics of the material have changed in the organic pads 34, whereas the material in the semi-metallic pads 32 exhibits no change.

Figure 7:
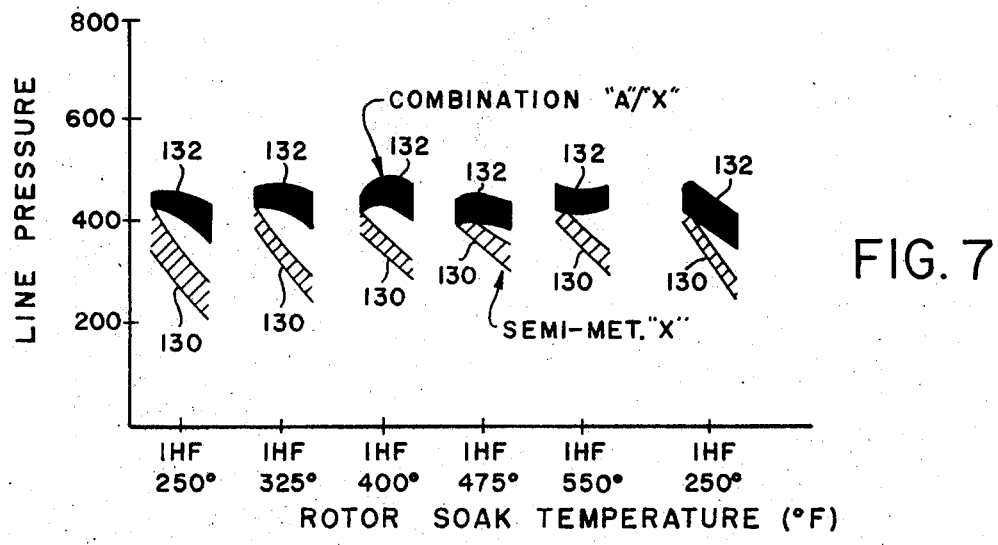
FIG. 7 is a graph similar to that of FIG. 6 comparing the hydraulic brake line pressure required to operate a disc brake having a combination of organic friction pads and semi-metallic friction pads compared with a disc brake semi-metallic friction pad.

When the same tests were conducted on combinations of organic pads 34 and semi-metallic pads 32, line 132, we found very little in-stop friction variation and very little change in the recheck at 250°F (see FIG. 7). Both of these characteristics are highly desirable to repeatedly predict frictional characteristics.

From the above data we have been able to predict and plot the coefficient of friction for the organic pad 34 as line 134, the semi-metallic pad 32, as line 136 and the combination as line 138. Thus, through the use of the combination it can be shown that the stopping friction from 80 mph to 0 mph can be maintained to provide uniform deceleration.

We claim:

1. A disc brake combination for use in a motor vehicle having a rotor means attached to a wheel and a stator means attached to a stationary portion of said vehicle adjacent the rotor means, said stator means comprising:

caliper means surrounding a first wear surface on one side and a second wear surface on another side of said rotor means, fluid receiving means responsive to a braking signal for moving said caliper means toward said first and second wear surfaces on the rotor means;

first pad means attached to said caliper means for engaging said first wear surface to create a first frictional resistance representative of said fluid signal, said first pad means consisting of a semi-metallic material having a composition of from 15–40 percent by volume of metal powder, 15 to 25 percent by volume of a metal fiber, 15–40 percent by volume of a first phenolic resin, 2–10 percent by volume of a ceramic powder, 15–40 percent by volume of a graphite or carbon particles, and 15–20 percent by volume of an elastomeric modifier, said first phenolic resin being cured to form a binder for retaining said metal powder, metal fiber, ceramic powder, graphite or carbon particles and elastomeric modifiers in a fixed relationship; and second pad means attached to said caliper means for engaging said second wear surface to create a second frictional resistance representative of said fluid signal, said second pad means consisting of an organic material having a composition of from 20–60 percent by volume of asbestos, 15–35 percent by volume of a second phenolic resin, 10–25 percent by volume of cashew nut powders, 3–15 percent by volume of elastomeric modifiers, 6–10 percent by volume of graphite or carbon, and 10–20 percent inorganic fillers, said second phenolic resin being cured to form a binder for retaining said asbestos and cashew nut powders in a fixed relationship, said first and second frictional resistances in the disc being combined to effectively produce a uniform coefficient of friction in response to said braking signal, said fluid receiving means will dissipate heat transmitted through said second pad means to maintain said uniform coefficient of friction in response to repetitive braking signals and to provide substantially equal wear with the first pad means, said first and second pad means upon heat generation during engagement with said rotor means because of said compositions will recover from a fade condition to permit a repetitive braking signal to re-establish said coefficient of friction.

* * * * *